United States Patent
Cheong et al.

(10) Patent No.: US 9,710,104 B2
(45) Date of Patent: Jul. 18, 2017

(54) TOUCH SCREEN WITH PALM REJECTION IN THE PRESENCE OF CHARGER NOISE

(71) Applicant: STMicroelectronics Asia Pacific Pte. Ltd., Singapore (SG)

(72) Inventors: CheeWeng Cheong, Singapore (SG); Leonard Dinu, Singapore (SG); Dianbo Guo, Singapore (SG); Kien Beng Tan, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 356 days.

(21) Appl. No.: 14/245,915

(22) Filed: Apr. 4, 2014

(65) Prior Publication Data

US 2015/0286297 A1    Oct. 8, 2015

(51) Int. Cl.
*G06F 3/041* (2006.01)

(52) U.S. Cl.
CPC .................................. *G06F 3/0418* (2013.01)

(58) Field of Classification Search
CPC ......................... G06F 3/03545; G06F 3/0418
See application file for complete search history.

(56) References Cited

U.S. PATENT DOCUMENTS

| | | | |
|---|---|---|---|
| 2005/0189154 A1* | 9/2005 | Perski | G06F 3/0418 178/18.06 |
| 2010/0097345 A1* | 4/2010 | Jang | G06F 3/0416 345/174 |
| 2013/0207926 A1 | 8/2013 | Kremin et al. | |
| 2013/0265281 A1* | 10/2013 | Zachut | G06F 3/03545 345/174 |
| 2014/0210780 A1* | 7/2014 | Lee | G06F 3/03545 345/174 |

* cited by examiner

*Primary Examiner* — Kent Chang
*Assistant Examiner* — Scott Au
(74) *Attorney, Agent, or Firm* — Gardere Wynne Sewell LLP

(57) ABSTRACT

A touch screen device having a touch screen panel and a method for operating a touch screen device are provided. The method includes monitoring, during a noise monitoring phase, channel signals of a first set of channels and a second set of channel of the touch screen panel, detecting a stylus signal in response to a channel signal greater than a stylus threshold and less than a palm threshold, selecting the first set of channels when the stylus signal is detected on at least one channel of the first set of channels and is not detected on the second set of channels, and selecting the second set of channels when the stylus signal is detected on at least one channel of the second set of channels and is not detected on the first set of channels.

20 Claims, 7 Drawing Sheets

| | X channels | Y channels | Conditions | Synchronization channels |
|---|---|---|---|---|
| Stylus Signal Detected? | No | No | No charger noise | If previous sync success, follow previous sync channels, else change to the other channels |
| | No | Yes | Stylus on Y channels | Y channels |
| | Yes | No | Stylus on X channels | X channels |
| | Yes | Yes | Stylus on both X and Y channels | If previous sync success, follow previous sync channels, else change to the other channels |

| X channels | Y channels | Conditions | Synchronization channels |
|---|---|---|---|
| No | No | No charger noise | If previous sync success, follow previous sync channels, else change to the other channels |
| No | Yes | Stylus on Y channels | Y channels |
| Yes | No | Stylus on X channels | X channels |
| Yes | Yes | Stylus on both X and Y channels | If previous sync success, follow previous sync channels, else change to the other channels |
| Stylus Signal Detected? | | | |

FIG. 6

TOUCH SCREEN WITH PALM REJECTION IN THE PRESENCE OF CHARGER NOISE

BACKGROUND

Technical Field

This disclosure relates to touch screen devices and to methods of operating touch screen devices. More particularly, the disclosure relates to touch screen devices which incorporate palm rejection in the presence of charger noise.

Discussion of the Related Art

A touch screen is a device that can detect an object in contact with or in proximity to a display area. The display area can be covered with a touch-sensitive matrix that can detect a user's touch by way of a finger or a stylus, for example. Touch screens are used in various applications such as mobile phones and other mobile devices. A touch screen may enable various types of user input, such as touch selection of items on the screen or alphanumeric input via a displayed virtual key pad. Touch screens can determine various parameters of the user's touch, such as the location, duration, etc.

One type of touch screen is a capacitive touch screen. A capacitive touch screen may include a matrix of conductive lines and columns overlaid on the display area. A change in capacitance between a line and a column may indicate that an object, such as a finger or a stylus, is touching the screen or is in proximity to the screen near the region of intersection of the line and column.

Some types of stylus have electronic functionality. In such cases, the touch screen device sends a wakeup signal at intervals during operation. If a stylus is within range and receives the wakeup signal, it responds with a synchronization signal. The synchronization signal is used to synchronize the stylus to the touch screen panel. During such use, any touching of the touch screen panel by the user's "palm" is rejected by the touch screen controller. As used herein, the term "palm" refers to any part of the user's hand, including but not limited to a finger, the palm or any other part of the hand.

It is commonplace that the touch screen device is used during the time when the device is plugged into a battery charger. Under such conditions, the touch screen device detects charger noise when the stylus or the palm contacts or is in proximity to the device. The charger noise degrades the ability of the touch screen device to detect the synchronization pulse from the stylus. Accordingly, there is a need for improved touch screen devices and methods for operating touch screen devices.

SUMMARY

The inventors have recognized that the capacitance between the touch screen panel and the stylus tip is smaller than the capacitance between the touch screen panel and the palm. Thus, the signal coupled to the touch screen panel by the stylus is smaller than the signal coupled by the palm. A double threshold palm rejection algorithm may be used to differentiate between the stylus and the palm. A coupled signal having a magnitude that exceeds a palm threshold is classified as a palm signal. A coupled signal having a magnitude that is less than the palm threshold but greater than a stylus threshold is classified as a stylus signal. A coupled signal having a magnitude that is less than both thresholds is not classified by the touch screen panel as either a palm signal or a stylus signal. If a palm signal is detected on a channel of the touch screen panel, that channel is rejected.

In one aspect, a method is provided for operating a touch screen device having a touch screen panel. The method comprises monitoring, during a noise monitoring phase, channel signals of a first set of channels and a second set of channel of the touch screen panel, detecting a stylus signal in response to a channel signal greater than a stylus threshold and less than a palm threshold, selecting the first set of channels when the stylus signal is detected on at least one channel of the first set of channels and is not detected on the second set of channels, and selecting the second set of channels when the stylus signal is detected on at least one channel of the second set of channels and is not detected on the first set of channels.

In embodiments, the method further comprises detecting a palm signal in response to a channel signal greater than the palm threshold and rejecting a channel on which the palm signal is detected.

In embodiments, monitoring the first set of channels and the second set of channels comprises monitoring X and Y channels of the touch screen panel.

In embodiments, monitoring the first set of channels and the second set of channels comprises monitoring the first set of channels followed by monitoring the second set of channels.

In embodiments, the method further comprises, in response to detecting no stylus signal on the first set of channels or the second set of channels, remaining on a current set of channels if the touch screen was previously synchronized, and otherwise changing to a different set of channels.

In embodiments, the method further comprises, in response to detecting the stylus signal on the first set of channels and the second set of channels, remaining on a current set of channels if the touch screen panel was previously synchronized, and otherwise changing to a different set of channels.

In embodiments, the method further comprises rejecting stylus signals on one or more channels on each side of a channel where a palm signal is detected.

In another aspect, a touch screen device comprises a touch screen panel having a first set of channels and a second set of channels, and a touch screen controller configured to monitor, during a noise monitoring phase, channel signals of the first set of channels and the second set of channels of the touch screen panel, to detect a stylus signal in response to a channel signal greater than a stylus threshold and less than a palm threshold, to select the first set of channels when the stylus signal is detected on at least one channel of the first set of channels and is not detected on the second set of channels, and to select the second set of channels when the stylus signal is detected on at least one channel of the second set of channels and is not detected on the first set of channels.

In a further aspect, a computer-readable storage device is encoded with computer-executable instructions that, when executed by a processing device, perform a method for operating a touch screen device having a touch screen panel. The method comprises monitoring, during a noise monitoring phase, channel signals of a first set of channels and a second set of channel of the touch screen panel, detecting a stylus signal in response to a channel signal greater than a stylus threshold and less than a palm threshold, selecting the first set of channels when the stylus signal is detected on at detected on the second set of channels, and selecting the second set of channels when the stylus signal is detected on at least one channel of the second set of channels and is not detected on the first set of channels.

BRIEF DESCRIPTION OF DRAWINGS

For a better understanding of the embodiments, reference is made to the accompanying drawings, which are incorporated herein by reference and in which:

FIG. 6 is a table that illustrates operation of a palm rejection algorithm under different conditions.

DETAILED DESCRIPTION

Figure 1:
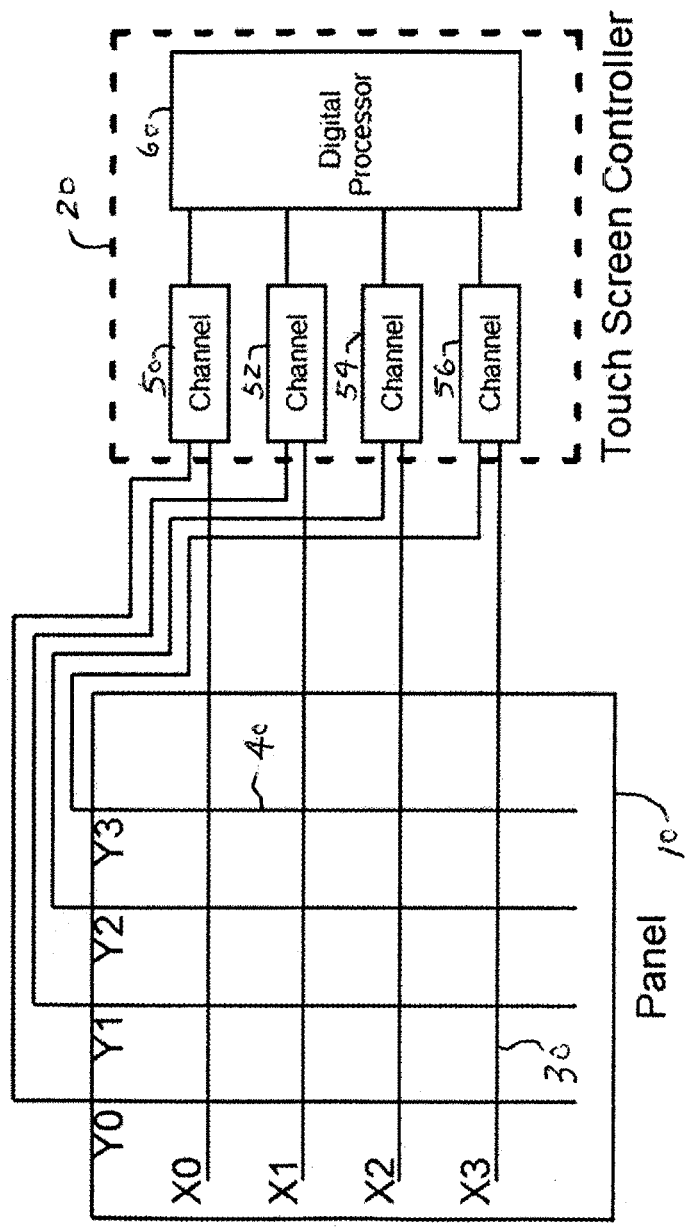
FIG. 1 is a schematic block diagram of a touch screen panel and a touch screen controller.

A schematic block diagram of a touch screen panel 10 and a touch screen controller 20 is shown in FIG. 1. Touch screen panel 10 includes spaced-apart horizontal line conductors 30 which form a set of X channels X0, X1, X2 and X3. The touch screen panel 10 further includes spaced-apart vertical column conductors 40 which form a set of Y channels Y0, Y1, Y2 and Y3. The line conductors 30 and the column conductors 40 may be transparent to allow light from an underlying display unit to pass through the panel for viewing by a user. The line conductors 30 cross, but do not contact, column conductors 40, thereby defining touch screen locations. The presence of a stylus or a palm at a touch screen location changes the capacitance between the line conductor 30 and the column conductor 40. The change in capacitance is detected by the touch screen controller 20. It will be understood that a typical implementation of a touch screen panel may have more X channels and more Y channels than shown in FIG. 1.

The X channels X0, X1, X2 and X3 and the Y channels Y0, Y1, Y2 and Y3 are connected to the touch screen controller 20. As shown in FIG. 1, touch screen controller 20 includes channels 50, 52, 54 and 56 connected in parallel to a digital processor 60. Channel 50 is coupled to X channel X0 and Y channel Y0; channel 52 is coupled to X channel X1 and Y channel Y1; channel 54 is coupled to X channel X2 and Y channel Y2; and channel 56 is coupled to X channel X3 and Y channel Y3. As described below, the X channels and the Y channels are processed at different times, and the channels 50, 52, 54 and 56 are time shared by the X channels and the Y channels. The digital processor 60 processes the channel outputs to determine touch locations.

Figure 2:
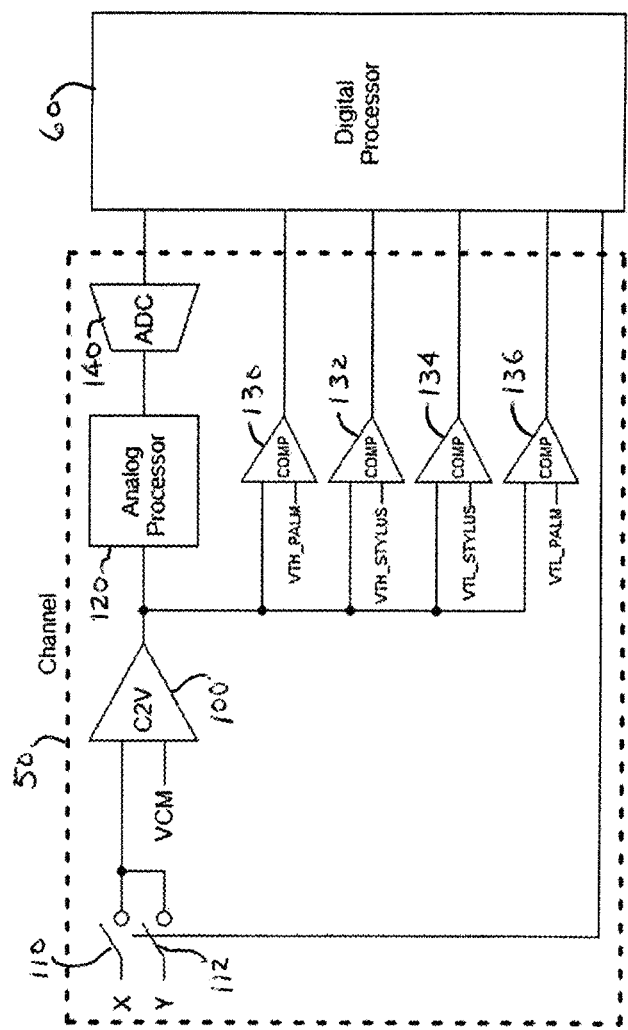
FIG. 2 is a schematic block diagram of a channel of the touch screen controller of FIG. 1, in accordance with embodiments.

A schematic block diagram of channel 50 and digital processor 60 is shown in FIG. 2. Channels 52, 54 and 56 may have the same configuration as channel 50.

Charge from an X channel or a Y channel of the touch screen panel 10 is coupled to a first input of a charge-to-voltage converter (C2V) 100. A reference voltage VCM (FIG. 4) is coupled to a second input of C2V 100. The X channel is coupled through a switch 110 to the first input of C2V 100, and the Y channel is coupled through a switch 112 to the first input of C2V 100. The switches 110 and 112 are controlled by digital processor 60 according to the channels being processed at a given time. The C2V 100 converts charge from the panel into a voltage signal which is supplied to an input of an analog processor 120 and to first inputs of comparators 130, 132, 134 and 136. The output of analog processor 120 is provided through an analog-to-digital converter (ADC) 140 to digital processor 60.

The comparators 130, 132, 134 and 136 compare the output of C2V 100 with different thresholds which are used to classify the channel signals as representative of a stylus or of a palm, as described below. In particular, a second input of comparator 130 receives a high palm threshold VTH_PALM; a second input of comparator 132 receives a high stylus threshold VTH_STYLUS; a second input of comparator 134 receives a low stylus threshold VTL_STYLUS; and a second input of comparator 136 receives a low palm threshold VTL_PALM. The outputs of comparators 130, 132, 134 and 136 are provided to digital processor 60 for processing as described below.

Figure 3:
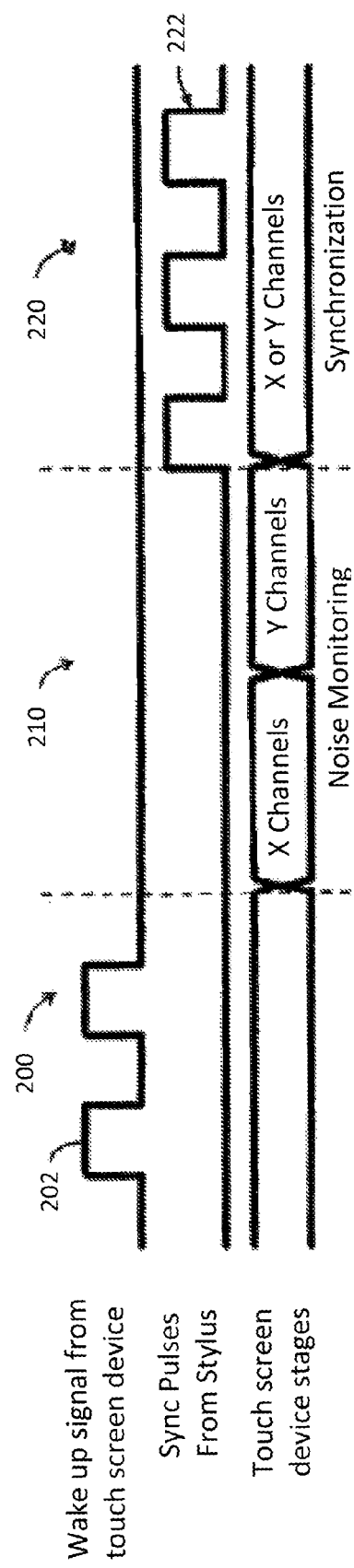
FIG. 3 is a timing diagram that illustrates a noise monitoring phase in relation to a wakeup signal from the touch screen device and a synchronization signal from a stylus.

A sequence of phases, in accordance with embodiments, is shown in the timing diagram of FIG. 3. In a wakeup phase 200, the touch screen panel 10 transmits a wakeup signal 202. The touch screen controller 20 drives the touch screen panel 10 with the wakeup signal 202, which may be a square wave. When a stylus is in close proximity to the touch screen panel, the wakeup signal is capacitively coupled from the panel to the stylus. In a noise monitoring phase 210 following the wakeup phase 200, the touch screen controller 20 monitors the X channels and the Y channels of the touch screen panel 10 as described below. The noise monitoring phase 210 is triggered by the end of the wakeup signal 202. In the noise monitoring phase 210, the touch screen controller 20 selects a set of channels for synchronization based on detection of a stylus signal using a dual threshold palm rejection algorithm. FIG. 3 shows that noise monitoring of the X channels is followed by noise monitoring of the Y channels. However, the order of noise monitoring can be reversed such that noise monitoring of the Y channels is followed by noise monitoring of the X channels. In a synchronization phase 220 following the noise monitoring phase 210, the stylus transmits a synchronization signal 222 to the touch screen panel 10 to enable synchronization of the stylus with the X channels or the Y channels as selected during the noise monitoring phase 210. The sequence of phases shown in FIG. 3 may be initiated periodically at intervals, by way of example only, of 10 ms (milliseconds).

In accordance with embodiments, the touch screen controller 20 executes a palm rejection algorithm to distinguish between a stylus touching or in proximity to the touch screen panel 10 and a palm, such as a finger, touching or in proximity to the touch screen panel 10. The capacitance between the touch screen panel 10 and a stylus tip is less than the capacitance between the touch screen panel 10 and a palm. Thus, the noise signal coupled to the panel by the stylus is less than the noise signal coupled to the panel by the palm. A double threshold palm rejection algorithm is used to differentiate between the stylus and the palm in the presence of charger noise, which is present when the mobile device is plugged into a charger.

Figure 4:
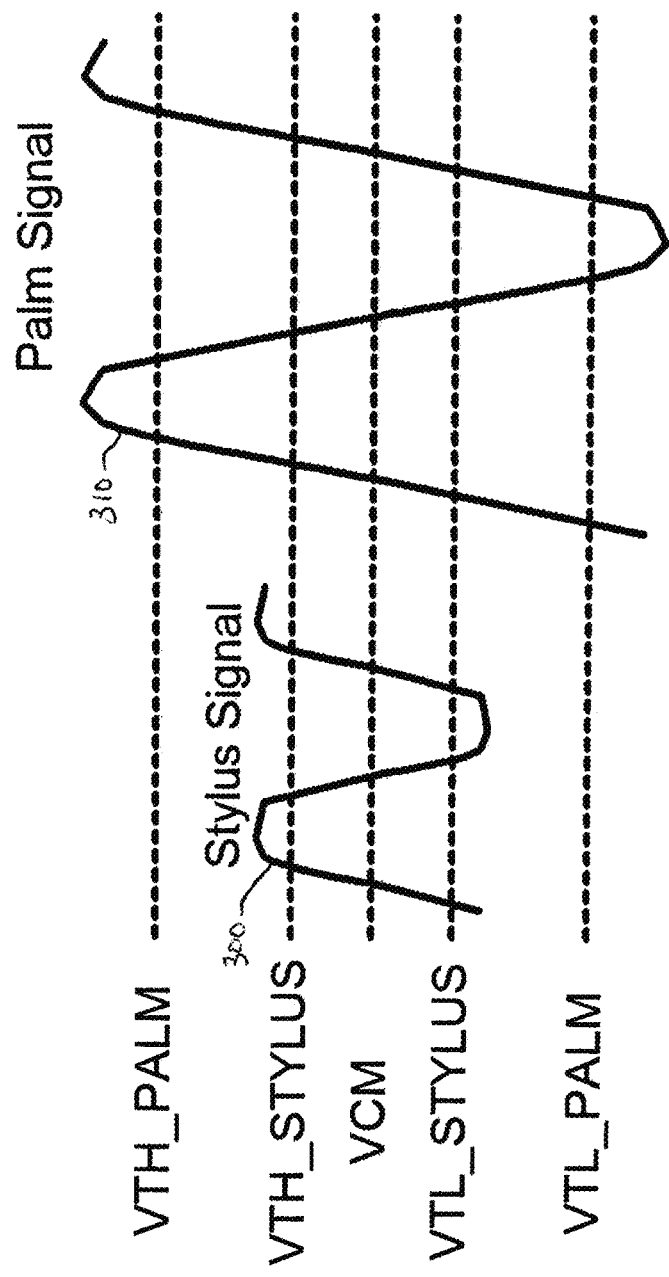
FIG. 4 is a timing diagram that illustrates stylus thresholds and palm thresholds in relation to a stylus signal and a palm signal.

Referring to FIG. 4, a stylus signal 300 is smaller than a palm signal 310 for a given level of charger noise. The thresholds shown in FIG. 4 are used to distinguish between a palm signal and a stylus signal. In particular, a channel signal from the touch screen panel is compared with a high palm threshold VTH_PALM, a high stylus threshold VTH_STYLUS, a low stylus threshold VTL_STYLUS and a low palm threshold VTL_PALM. The channel signals are compared with the respective thresholds by the comparators 130, 132, 134 and 135 shown in FIG. 2 and described above.

As shown in FIG. 4, the high palm threshold VTH_PALM and the high stylus threshold VTH_STYLUS are positive with respect to the reference voltage VCM, with the high palm threshold having a larger magnitude than the high stylus threshold. The low palm threshold VTL_PALM and the low stylus threshold VTL_STYLUS are negative with respect to the reference voltage VCM, with the low palm threshold having a larger magnitude than the low stylus threshold.

Referring again to FIG. 4, a channel signal is classified by the digital processor 60 (FIG. 2) as a stylus signal if the channel signal is between the high stylus threshold VTH_STYLUS and the high palm threshold VTH_PALM, or between the low stylus threshold VTL-STYLUS and the low palm threshold VTL_PALM. A channel signal is classified as a palm signal if the channel signal exceeds the high palm threshold VTH_PALM or the low palm threshold VTL_PALM. A channel signal between the high stylus threshold VTH_STYLUS and the low stylus threshold VTL_STYLUS is not classified as a stylus signal or a palm signal.

Figure 5:
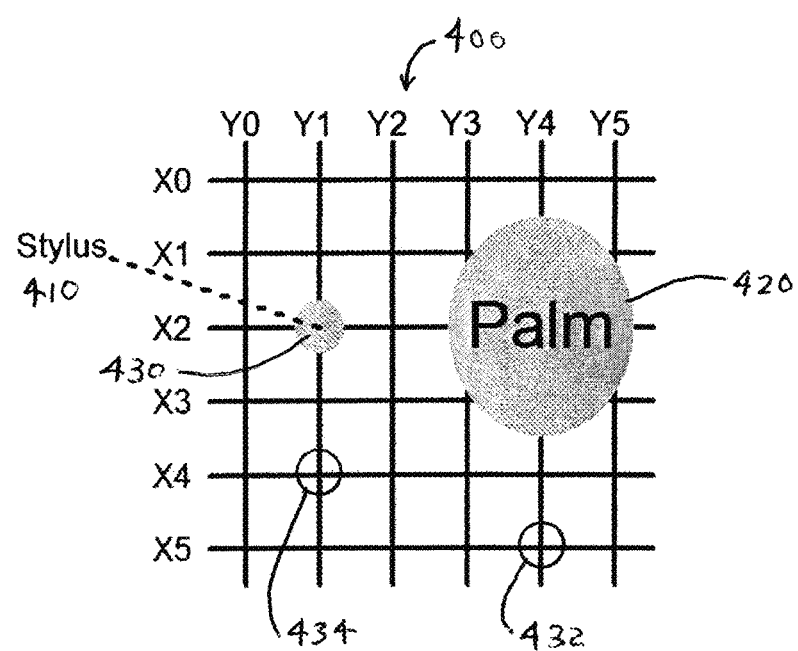
FIG. 5 is a schematic representation of the touch screen panel with a stylus and a palm touching the panel.

A schematic representation of a touch screen panel 400 including X channels X0-X5 and Y channels Y0-Y5 is shown in FIG. 5. A stylus 410 and a palm 420 are shown as touching the touch screen panel 400. Stylus 410 is positioned at location 430 at the intersection of X channel X2 and Y channel Y1. Palm 420 is centered at the intersection of X channel X2 and Y channel Y4, but is large enough to cover several channels of the touch screen panel 400.

Considering operation of the palm rejection algorithm, the touch screen controller 20 compares the channel signals with each of the thresholds shown in FIG. 4 and described above. If the noise monitoring phase begins with the X channels, channels X1, X2 and X3 are rejected, since the palm signal is detected on these channels. In particular, the presence of palm 420 on channels X1, X2 and X3 causes the channel signal to exceed the palm threshold and to be identified as a palm signal. Thus, channels X1, X2 and X3 are rejected and the stylus signal is not detected on any of the X channels. The stylus signal is effectively masked by the palm signal on the X channels.

Following monitoring of the X channels, the Y channels are monitored. In this case, the Y channels Y3, Y4 and Y5 are rejected, since the channel signals on these channels exceed the palm threshold. On Y channel Y1, a stylus signal is detected, since the palm signal does not appear on Y channel Y1. In particular, the touch screen controller 20 receives a channel signal on channel Y1 which is greater than the stylus threshold but is less than the palm threshold. Since the stylus signal is detected on the Y channels and is not detected on the X channels in the example of FIG. 5, the Y channels are selected for synchronization.

It will be understood that different results will be obtained for different locations of the stylus 410 and the palm 420 on the touch screen panel 400. For example, if the stylus 410 is moved to location 432 at the intersection of X channel X5 and Y channel Y4, the stylus signal is detected on channel X5 but is not detected on any of the Y channels. In this example, the X channels are selected for synchronization.

In a further example, assume that stylus 410 is moved to location 434 at the intersection of X channel X4 and Y channel Y1. In this example, the stylus signal is detected on both X channel X4 and Y channel Y1, and detection of the stylus is not affected by the presence of palm 420 on the touch screen panel 400.

A table that illustrates operation of the palm rejection algorithm under different conditions is shown in FIG. 6. Column 500 indicates whether a stylus signal is detected on the X channels, and column 510 indicates whether a stylus signal is detected on the Y channels. Column 520 indicates the conditions which produce the stylus signals shown in columns 500 and 510, and column 530 indicates the channels that are selected for synchronization based on the corresponding conditions.

In a condition where a stylus signal is detected on the Y channels but is not detected on the X channels (row 2 of the table), the Y channels are selected for synchronization. This conditions corresponds, for example, to a stylus at location 430 shown in FIG. 5.

In a condition where a stylus signal is detected on the X channels but is not detected on the Y channels (row 3 of the table), the X channels are selected for synchronization. This condition corresponds, for example, to a stylus at location 432 shown in FIG. 5.

In a condition where a stylus signal is detected on the X channels and on the Y channels (row 4 of the table), the presence of the palm on the touch screen panel does not affect stylus detection. In this condition, if the previous synchronization was successful, synchronization continues with the current set of channels. Otherwise, the opposite set of channels is selected for synchronization. This condition corresponds, for example, to the stylus at location 434 shown in FIG. 5.

A condition where a stylus signal is not detected on either the X channels or the Y channels (row 1 of the table) indicates that no charger noise is present and/or that a stylus is not touching or in proximity to the touch screen panel. Similar to the case where the stylus is detected on both the X and Y channels, the current channels are selected for synchronization if synchronization was previously successful. Otherwise, the opposite set of channels is selected for synchronization.

Figure 7:
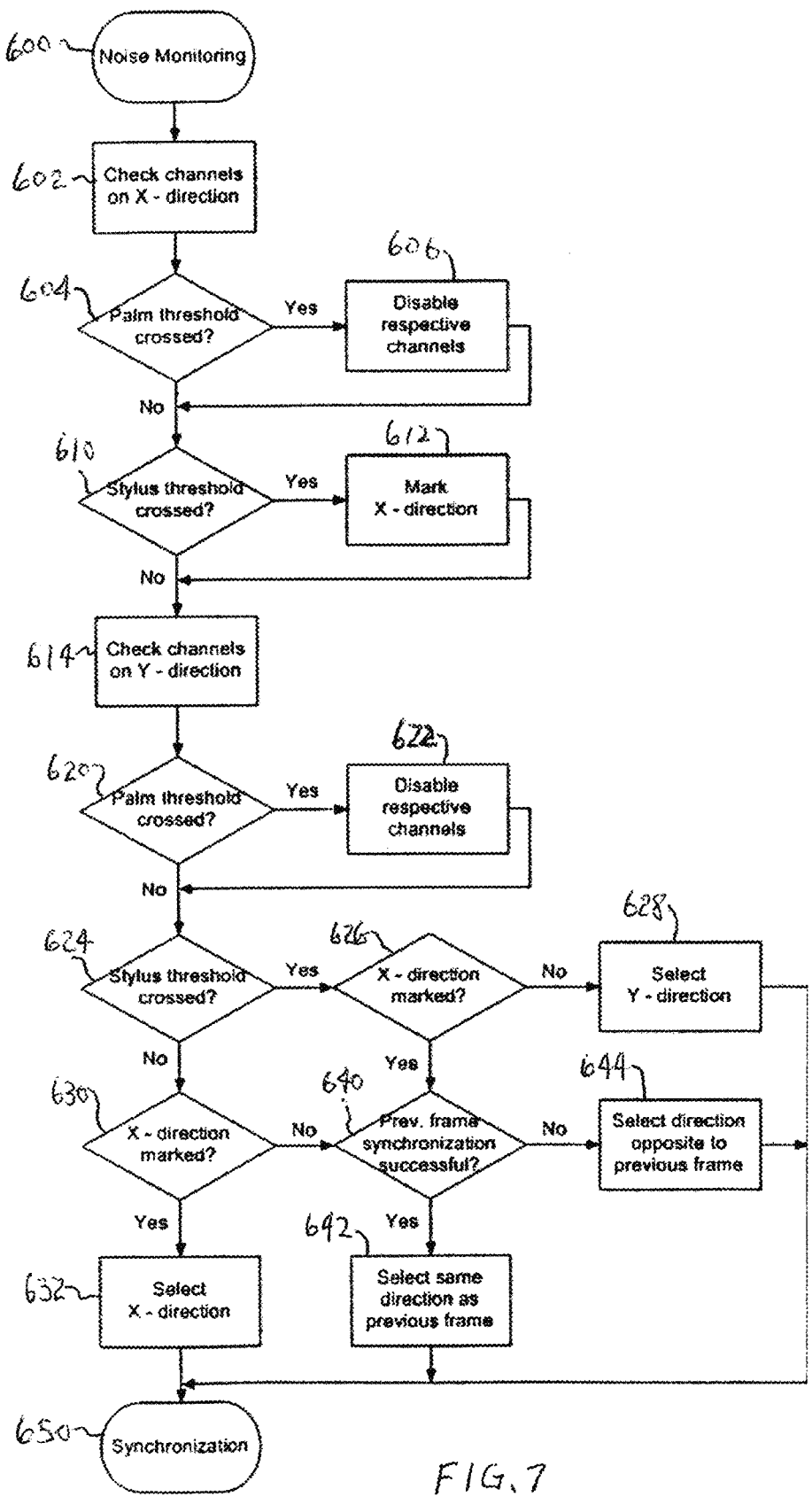
FIG. 7 is a flowchart of the palm rejection algorithm in accordance with embodiments.

A flowchart of the palm rejection algorithm in accordance with embodiments is shown in FIG. 7. The palm rejection algorithm may be executed by the digital processor 60 in response to the outputs of comparators 130, 132, 134 and 136 from each of the channels 50, 52, 54 and 56, as shown in FIGS. 1 and 2. In particular, the digital processor 60 may include a processing device and a computer-readable storage device encoded with computer-executable instructions that, when executed by the processing device, perform the process shown in the flowchart of FIG. 7. It will be understood that some acts shown in the flowchart may be omitted and that additional acts may be performed within the embodiments described herein.

In act 600, the noise monitoring phase is initiated by the end of the wakeup signal 202 (FIG. 3). In act 602, the X channels are monitored by reading the comparator outputs in each of the channels 50, 52, 54 and 56. In act 604, a determination is made as to whether the palm threshold has been crossed in respective channels. The palm threshold is discussed above in connection with FIG. 3. If the palm threshold is crossed, the respective X channels are disabled in act 606. After the respective channels are disabled in act 606 or a determination is made in act 604 that the palm threshold has not been crossed, the process proceeds to act 610.

In act 610, a determination is made as to whether the X channel signals have crossed the stylus threshold. The stylus threshold is discussed above in connection with FIG. 3. If the stylus threshold is crossed, the respective X channels are marked accordingly in act 612. After marking of the X channels in act 612 or a determination is made in act 610 that the stylus threshold has not been crossed, the process proceeds to act 614.

In act 614, the Y channels are monitored by reading the comparator outputs in each of the channels 50, 52, 54 and 56. In act 620, a determination is made as to whether the palm threshold has been crossed in respective Y channels. If the palm threshold has been crossed, the respective Y channels are disabled in act 622. After the respective Y channels have been disabled in act 622 or a determination is made in act 620 that the palm threshold has not been crossed, the process proceeds to act 624.

In act 624, a determination is made as to whether the Y channel signals have crossed the stylus threshold. If Y channel signals crossed the stylus threshold, a determination is made in act 626 as to whether the X channels have been marked. If the X channels have not been marked, the process proceeds from act 626 to act 628. In act 628, the Y channels are selected for synchronization.

If the Y channel signals are determined in act 624 not to have crossed the stylus threshold, a determination is made in act 630 as to whether the X channels were previously marked. If the X channels are determined in act 630 to have been marked, the process proceeds to act 632. In act 632, the X channels are selected for synchronization.

If the X channels are determined in act 626 to have been marked or are determined in step 630 not to have been marked, the process proceeds to act 640. In act 640, a determination is made as to whether the previous frame synchronization was successful. If the previous frame synchronization was successful, the same channels as the previous frame are selected for synchronization in act 642. If the previous frame synchronization was not successful, the opposite channels from the previous frame are selected for synchronization in act 644. Following act 628, act 632, act 642 or act 644, the process proceeds to the synchronization phase in act 650.

In FIG. 7 and the above description, monitoring of the X channels is followed by monitoring of the Y channels. As discussed above, the order of monitoring can be reversed, such that monitoring of the Y channels is followed by monitoring of the X channels. In such embodiments, FIG. 7 can be modified accordingly.

As explained above, the palm signal has a larger magnitude than the stylus signal. Further, as shown in FIG. 5, the palm typically covers a larger area than a stylus and in particular may cover several locations of the touch screen panel. The palm signal has a maximum value near the center of the palm and gradually decreases with distance from the center of the palm. This raises the possibility that the palm signal could mistakenly be classified as a stylus signal, for example near the edge of an area where the palm contacts the touch screen panel. As shown in FIG. 5, X channel X0 is near the edge of palm 420 and may provide a channel signal that is less than the palm threshold but greater than the stylus threshold. In such a case, the touch screen controller 20 may incorrectly classify the channel signal on X channel X0 as a stylus signal. To avoid such incorrect classification of channel signals, stylus signals detected on one or more channels on each side of a channel where a palm signal is detected can be rejected as invalid. Thus, in the above example, a channel signal greater than the stylus threshold and less than the palm threshold on X channel X0 is rejected by the touch screen controller as an invalid stylus signal. The number of channels on each side of a channel where a palm signal is detected can be selected to optimize performance.

Having thus described at least one illustrative embodiment of the invention, various alterations, modifications and improvements will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for operating a touch screen device having a touch screen panel, comprising:
   monitoring, during a noise monitoring phase, channel signals of channels of the touch screen panel;
   detecting a stylus noise signal in response to a channel signal having a channel signal magnitude greater than a stylus threshold and less than a palm threshold;
   detecting a palm noise signal in response to the channel signal magnitude being greater than the palm threshold, wherein the palm threshold has a greater magnitude than the stylus threshold;
   selecting a first set of channels with detected stylus noise signals, in response to the detecting the stylus noise signal, and wherein the stylus noise signal has a lesser magnitude than the palm noise signal;
   disabling a second set of channels with detected palm noise signals, in response to the detecting the palm noise signal, and wherein the palm noise signal has a greater magnitude than the stylus noise signal whereby the palm noise signal masks the stylus noise signal;
   receiving a synchronization signal transmitted by a stylus on the selected first set of channels; and
   synchronizing the stylus with the selected first set of channels during a synchronization phase.

2. A method for operating a touch screen device as defined in claim 1, wherein monitoring the channel signals of channels comprises monitoring channel signals of X and Y channels of the touch screen panel.

3. A method for operating a touch screen device as defined in claim 1, wherein monitoring the channel signals comprises monitoring the first channels extending in a first direction followed by monitoring the second channels extending in a second direction perpendicular to the first direction.

4. A method for operating a touch screen device as defined in claim 1, further comprising:
   detecting no stylus noise signal, and
   in response to said detecting, then remaining on a current set of channels if the touch screen panel was previously synchronized, and otherwise changing to a different set of channels.

5. A method for operating a touch screen device as defined in claim 1, further comprising, in response to detecting the stylus noise signal, remaining on a current set of channels if the touch screen panel was previously synchronized, and otherwise changing to a different set of channels.

6. A method for operating a touch screen device as defined in claim 1, further comprising rejecting stylus noise signals on one or more channels on each side of a channel where the palm noise signal is detected.

7. A touch screen device comprising:
   a touch screen panel having a first set of channels and a second set of channels; and a touch screen controller configured to:
monitor, during a noise monitoring phase, channel signals of channels of the touch screen panel;
detect a stylus noise signal in response to a channel signal having a channel signal magnitude greater than a stylus threshold and less than a palm threshold;
detect a palm noise signal in response to the channel signal having the channel signal magnitude greater than the palm threshold and greater than the stylus threshold;
select the first set of channels with detected stylus noise signals, in response to the detecting the stylus noise signals, and wherein the stylus noise signal has a lesser magnitude than the palm noise signal;
deselect the second set of channels with detected palm noise signals, in response to the detecting the palm noise signal, and wherein the palm noise signal has a greater magnitude than the stylus noise signal whereby the palm noise signal masks the stylus noise signal;
receive a synchronization signal transmitted by a stylus on the selected first set of channels; and
synchronize the stylus with the selected first set of channels during a synchronization phase.

8. A touch screen device as defined in claim 7, wherein the touch screen controller comprises first comparators configured to compare respective channel signals with the palm threshold and second comparators configured to compare respective channel signals with the stylus threshold.

9. A touch screen device as defined in claim 7, wherein the touch screen controller comprises first comparators configured to compare respective channel signals with a high palm threshold, second comparators configured to compare respective channel signals with a high stylus threshold, third comparators configured to compare respective channel signals with a low stylus threshold, and fourth comparators configured to compare respective channel signals with a low palm threshold.

10. A touch screen device as defined in claim 7, wherein the touch screen controller is configured to monitor first channels extending in a first direction during a first time period of the noise monitoring phase and to monitor second channels extending in a second direction during a second time period of the noise monitoring phase.

11. A touch screen device as defined in claim 7, wherein the touch screen controller is further configured, in response to detecting no stylus noise signal, to remain on a current set of channels if the touch screen panel was previously synchronized, and otherwise to change to a different set of channels.

12. A touch screen device as defined in claim 7, wherein the touch screen controller is further configured, in response to detecting the stylus noise signal, to remain on a current set of channels if the touch screen panel was previously synchronized, and otherwise to change to a different set of channels.

13. A touch screen device as defined in claim 7, wherein the touch screen controller is further configured to reject stylus noise signals on one or more channels on each side of a channel where the palm noise signal is detected.

14. A method, comprising:
performing noise monitoring with respect to a touch screen panel having a plurality of channels, wherein performing noise monitoring comprises:
detecting channel signals on the channels;
identifying the detected signals as a stylus noise signal if the channel signal exceeds a stylus threshold and is less than a palm threshold; and
identifying the detected signals as a palm noise signal if the channel signal exceeds the palm threshold,
wherein the palm threshold is greater than the stylus threshold; and
synchronizing a stylus to the touch screen panel by:
selecting first channels of the plurality of channels having identified stylus noise signals in response to the identifying the detected signals as the stylus noise signal;
disabling second channels of the plurality of channels having identified palm noise signals in response to the identifying the detected signals as the palm noise signal, wherein the stylus noise signal has a lesser magnitude than the palm noise signal and wherein the palm noise signal masks the stylus noise signal;
receiving from the stylus a stylus synchronization signal on the selected first channels; and
synchronizing to the stylus in response to the stylus synchronization signal received on the selected first channels.

15. The method of claim 14, wherein disabling second channels comprises disabling the second channels from use in receiving the stylus synchronization signal wherein the palm noise signal is prevented from masking the stylus noise signal.

16. The method of claim 14, wherein the plurality of channels comprise a first plurality of channels extending in a first direction and a second plurality of channels extending in a second direction perpendicular to the first direction.

17. The method of claim 16, wherein the first and second channels are within the first plurality of channels.

18. The method of claim 16, wherein the first and second channels are within the second plurality of channels.

19. The method of claim 17, further comprising, if no stylus noise signals are detected in the first plurality of channels, performing the step of noise monitoring on the second plurality of channels.

20. The method of claim 17, further comprising, if stylus noise signals are detected in the first plurality of channels, performing synchronization with respect to the selected first channels of the first plurality of channels.

* * * * *

UNITED STATES PATENT AND TRADEMARK OFFICE
CERTIFICATE OF CORRECTION

PATENT NO. : 9,710,104 B2
APPLICATION NO. : 14/245915
DATED : July 18, 2017
INVENTOR(S) : Chee Weng Cheong et al.

Page 1 of 1

It is certified that error appears in the above-identified patent and that said Letters Patent is hereby corrected as shown below:

In the Claims

At Column 9, Claim number 7, Line number 16, please replace the word [[deselect]] with the word -- disable --.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*